US005276592A

United States Patent [19]

Henkes

[11] Patent Number: 5,276,592

[45] Date of Patent: Jan. 4, 1994

[54] HEADLIGHT FOR MOTOR VEHICLES

[75] Inventor: John L. Henkes, Latham, N.Y.

[73] Assignee: General Electric Company, Schenectady, N.Y.

[21] Appl. No.: 925,064

[22] Filed: Aug. 5, 1992

[51] Int. Cl.[5] .......................... B60Q 1/04; F21M 3/16

[52] U.S. Cl. ....................................... 362/61; 362/299; 362/301; 362/346

[58] Field of Search ................. 362/61, 268, 297, 298, 362/299, 301, 308, 309, 327, 328, 346

[56] References Cited

U.S. PATENT DOCUMENTS

| | | | |
|---|---|---|---|
| 965,401 | 7/1910 | Nilsson | 362/268 |
| 1,594,742 | 8/1926 | Lord | 362/297 |
| 2,114,232 | 4/1938 | Müller | 362/268 |
| 2,215,203 | 9/1940 | Young | 362/268 |
| 2,907,249 | 10/1959 | Hjermstad | 362/329 |
| 3,457,401 | 7/1969 | Hoekstra | 362/268 |

FOREIGN PATENT DOCUMENTS

| | | | |
|---|---|---|---|
| 69794 | 8/1941 | Czechoslovakia | 362/268 |

*Primary Examiner*—Ira S. Lazarus
*Assistant Examiner*—L. Heyman
*Attorney, Agent, or Firm*—Marvin Snyder; Enrique J. Mora

[57] ABSTRACT

A vehicular headlight having a low height-to-width ratio includes a plurality of collimating lenses. The collimated light output from certain ones of the lenses is redirected into the forward direction by separate sets of reflectors associated with the respective lenses. Means are provided to impose a desired light pattern on the forward-directed light outputs.

14 Claims, 3 Drawing Sheets

HEADLIGHT FOR MOTOR VEHICLES

BACKGROUND OF THE INVENTION

This invention relates in general to headlights and in particular to headlights having a low height-to-width ratio which makes them suitable for incorporation into motor vehicles or the like having highly streamlined bodies.

The streamlining of motor vehicle bodies presents problems with respect to the incorporation of the vehicle headlights. The styling of many cars is so extreme that headlights having conventional dimensions cannot be incorporated into the contours of the car. In many instances these lights are constructed to be movable between a storage position in which they conform to the exterior contours of the vehicle body, and an operating position in which they are erect and jut out from the body. The mechanism for moving the headlights between these two positions adds to the weight and cost of the vehicle and poses additional problems of reliability.

While it is desirable to provide headlights of reduced height which are capable of conforming to the contours of streamlined vehicle bodies, conventional headlights frequently cannot be adapted to these dimensional constraints. A conventional headlight generally includes a light source and a parabolic reflector element which causes a collimated light beam to be projected in a forward direction. The parabolic reflector must be capable of collecting and reflecting a sufficient amount of the light emitted by the light source to meet the forward illumination requirements of the vehicle. If, due to dimensional constraints of the overall headlight dimensions, the reflector element must be below a minimum height of about two inches, the light output of such a headlight will be insufficient to meet those illumination requirements. Hence, for such situations, the above-mentioned dual position headlight is generally preferred.

In a conventional headlight, a portion of the output of the light source does not reach the parabolic reflector element and is projected forward in scattered form. As such, it contributes only little to the illuminating strength of the projected light beam. In order to strengthen the light beam, some headlights include a collimating lens placed forward of the light source, which has the effect of collimating and projecting forward this previously scattered portion of the output of the light source and thus strengthening the projected light beam. However, even that contribution may be insufficient to overcome the light deficiency that arises when the headlight is subject to the previously stated height constraint.

Accordingly, it is a primary object of this invention to provide a headlight of reduced height-to-width ratio which is not subject to the disadvantages associated with existing vehicle headlights.

It is a further object of the present invention to provide a vehicle headlight of reduced height-to-width ratio which is capable of meeting the forward illumination requirements of the vehicle on which it is mounted.

SUMMARY OF THE INVENTION

The invention is directed to a new and improved headlight having a relatively low height-to-width ratio and capable of projecting a forward-directed light beam whose axis is substantially normal to the height and width dimensions of the headlight. A plurality of substantially identical collimating lenses is arrayed around a light source. The optical axes of these lenses lie in a common plane and their focal points are located substantially at the light source center. The light from the light source received by each lens is converted into a collimated light output wherein the light rays are parallel to the lens axis.

One of the collimating lenses is positioned forward of the light source and its axis substantially coincides with the beam axis. All of the other collimating lenses have reflectors associated therewith which redirect the received collimated light outputs into the forward direction. Means are provided to impose a desired light pattern on the forward-directed light outputs.

BRIEF DESCRIPTION OF THE DRAWINGS

The subject matter which is regarded as the invention is particularly pointed out and claimed in the concluding portion of the specification; however, the foregoing and other objects of the invention, together with further features and advantages thereof, will be best ascertained from the following detailed description when read in conjunction with the accompanying drawings, wherein applicable reference numbers and letters have been carried forward, and wherein:

DETAILED DESCRIPTION OF THE INVENTION

Figure 2:
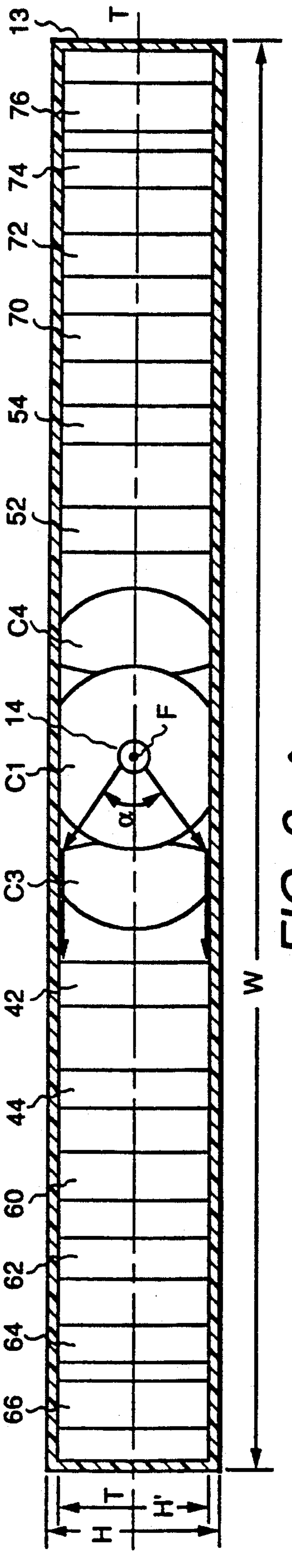
FIG. 2 is a front elevation view of the apparatus shown in FIG. 1.
Figure 1:
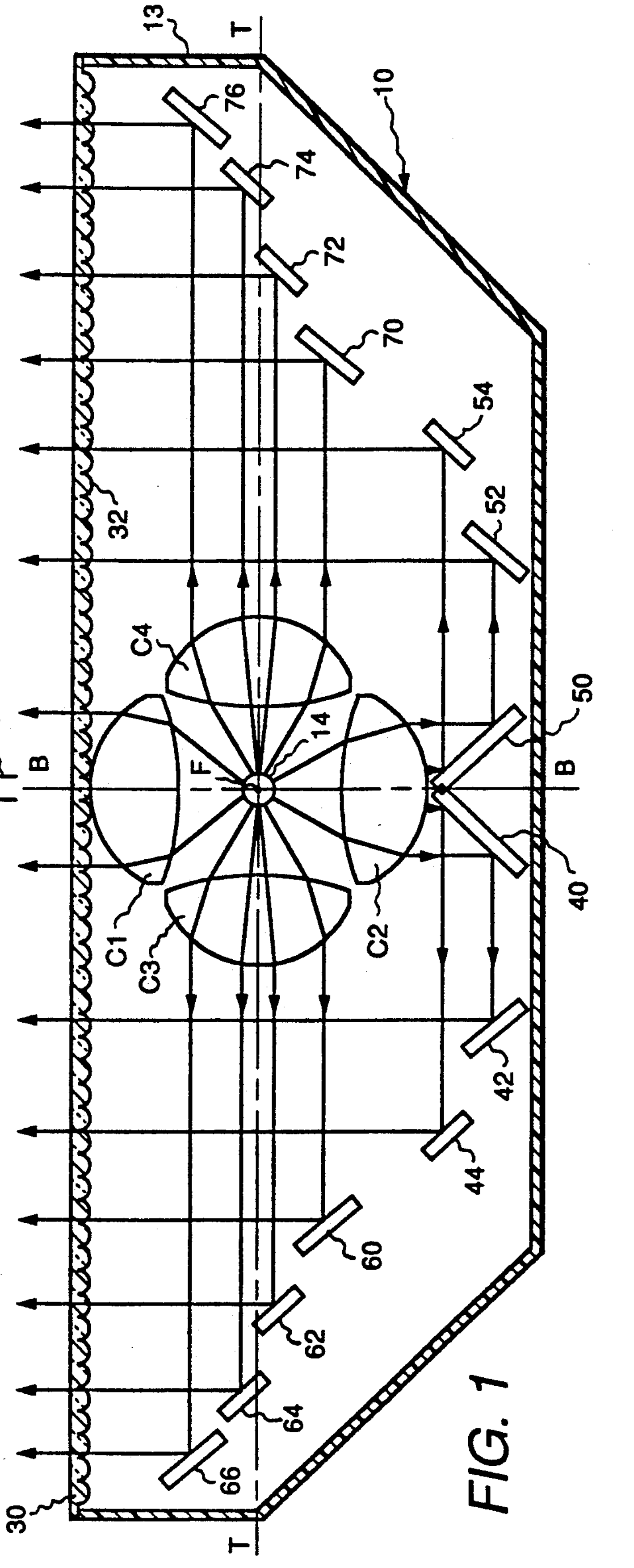
FIG. 1 is a plan view of a preferred embodiment of a headlight in accordance with the present invention.

Referring to the drawings, FIGS. 1 and 2 show a headlight 10 capable of projecting a forward-directed light beam schematically represented by arrow 12 in FIG. 1. The axis of light beam 12 is designated B—B, as shown in FIG. 1, and extends substantially normal to the height dimension H and the width dimension W of headlight housing 13, as shown in FIG. 2. A lateral axis T—T, which extends parallel to the width dimension of headlight housing 13, is selected so as to perpendicularly intersect axis B—B at a point F. As seen from FIG. 2, the height-to-width ratio H/W of the headlight housing is low and ranges from about 1:8 to about 1:4.

A light source 14 centered at point F is surrounded by a plurality of substantially identical collimating lenses C1, C2, C3 and C4, spaced at regular intervals around the light source. The collimating lenses are positioned with their optical axes in the plane defined by axes B—B and T—T. The lenses are equidistantly spaced from point F so that their focal points substantially coincide at the center of light source 14. As seen in FIG. 2, each of the collimating lenses has a height substantially equal to the interior height dimension H′ of headlight housing 13. Thus, dimension H′ determines the solid angle $\alpha$ within which each lens receives light from the light source. The light received by each lens is converted into a collimated light output wherein the light rays are parallel to the lens axis.

Lens C1 is positioned forward of the light source, with its optical axis coincident with axis B—B, so that its collimated light output directly contributes to light beam 12. As shown in FIG. 1, lens C2, positioned rearward of light source 14 on axis B—B, has associated therewith a first set of reflectors 40, 42 and 44 and a second reflector set 50, 52 and 54. The first and second reflector sets are positioned on opposite sides of axis B—B in mirror image relationship to each other. The third and fourth lenses C3 and C4 are positioned on axis T—T on opposite sides of axis B—B. A third reflector set 60, 62, 64 and 66 is associated with lens C3 and is positioned on one side of axis B—B; and a fourth reflector set 70, 72, 74 and 76, associated with lens C4, is positioned on the opposite side of axis B—B in mirror image relationship to the third reflector set. Each reflector of the aforementioned reflector sets has a planar reflecting surface which is substantially perpendicular to the plane defined by axes B—B and T—T and is positioned at an angle to axis B—B so as to redirect the collimated light output from the associated lens into a forward direction substantially parallel to axis B—B, as shown in FIG. 1.

The first reflector 40 and 50 of the first and second reflector sets, respectively, is located rearward of lens C2 and is positioned at an angle of about 45° relative to axis B—B so as to direct the collimated light output from lens C2 in opposite directions away from axis B—B. Additional reflectors 42, 44 in the first reflector set, are positioned at an angle of about 90° relative to first reflector 40. Similarly, additional reflectors 52, 54 in the second reflector set are positioned at about 90° relative to first reflector 50. Thus, the reflectors within each set cooperate to redirect light received from lens C2 into the forward direction, as shown in FIG. 1. Reflectors 42, 44 and 52, 54 are seen to be laterally spaced from axis B—B. The lateral spacing is chosen to avoid interference by the reflectors with light reflected by a neighboring reflector, as well as interference by collimating lenses C3 and C4 with light reflected by reflectors 42 and 52, respectively.

It will be appreciated by those skilled in the art that alternative arrangements may be substituted for the first and second reflector sets. For example, reflectors 42 and 44 may be implemented as a single planar reflector, or as more than two reflectors. The same is true for reflectors 52 and 54, the sole criterion being that the reflectors be capable of redirecting the collimated light output received from lens C2 into a forward direction.

Each reflector of the third and fourth reflector sets has an angular orientation of about 45° with respect to axis B—B so that the collimated light outputs received from lenses C3 and C4 respectively, are redirected into the forward direction. Here again, a greater or lesser number of reflectors may be used, as determined by the available interior space of the headlight housing. In all cases the lateral spacing from axis B—B is sufficient to avoid interference by the respective reflectors within each of the reflector sets with light reflected by a neighboring reflector, and with the light reflected by the first and second reflector sets, respectively.

As seen from FIGS. 1 and 2, reflectors 42 and 44, as well as reflectors 60, 62, 64, and 66 each form an array in which successive reflectors are laterally spaced from each other. The effect is to widen projected beam 12 by laterally distributing the light substantially along the full width of the headlight housing. A light-transmissive frontal lens 30 is positioned forward of the collimating lenses and the reflectors to close off or seal the headlight housing. In the embodiments of the invention illustrated in FIGS. 1 and 4, the inner surface of frontal lens 30 includes light-refracting means consisting of an array of lenticules 32 configured to impose a desired light pattern on the forward-directed light outputs.

Figure 3:
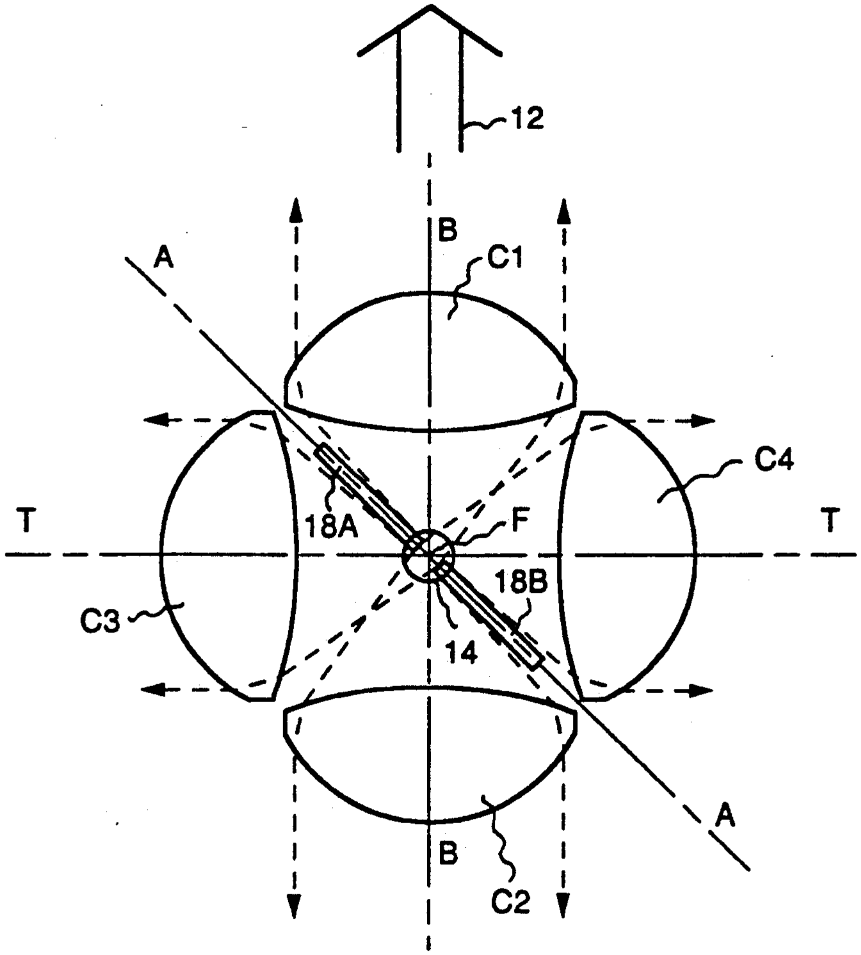
FIG. 3 illustrates a variation of the embodiment shown in FIG. 1.

FIG. 3 illustrates a variation of the embodiment shown in FIG. 1 wherein an elongated, substantially linear arc light 14 is used as the light source. The axis A—A of arc light 14 is positioned in the plane defined by axes B—B and T—T, and forms an angle of 45° relative to each of axes B—B and T—T. This arrangement allows collimating lenses C1-C4 to collect light from the arc light without interference by the arc light envelope or electrodes 18A, 18B.

Figure 4:
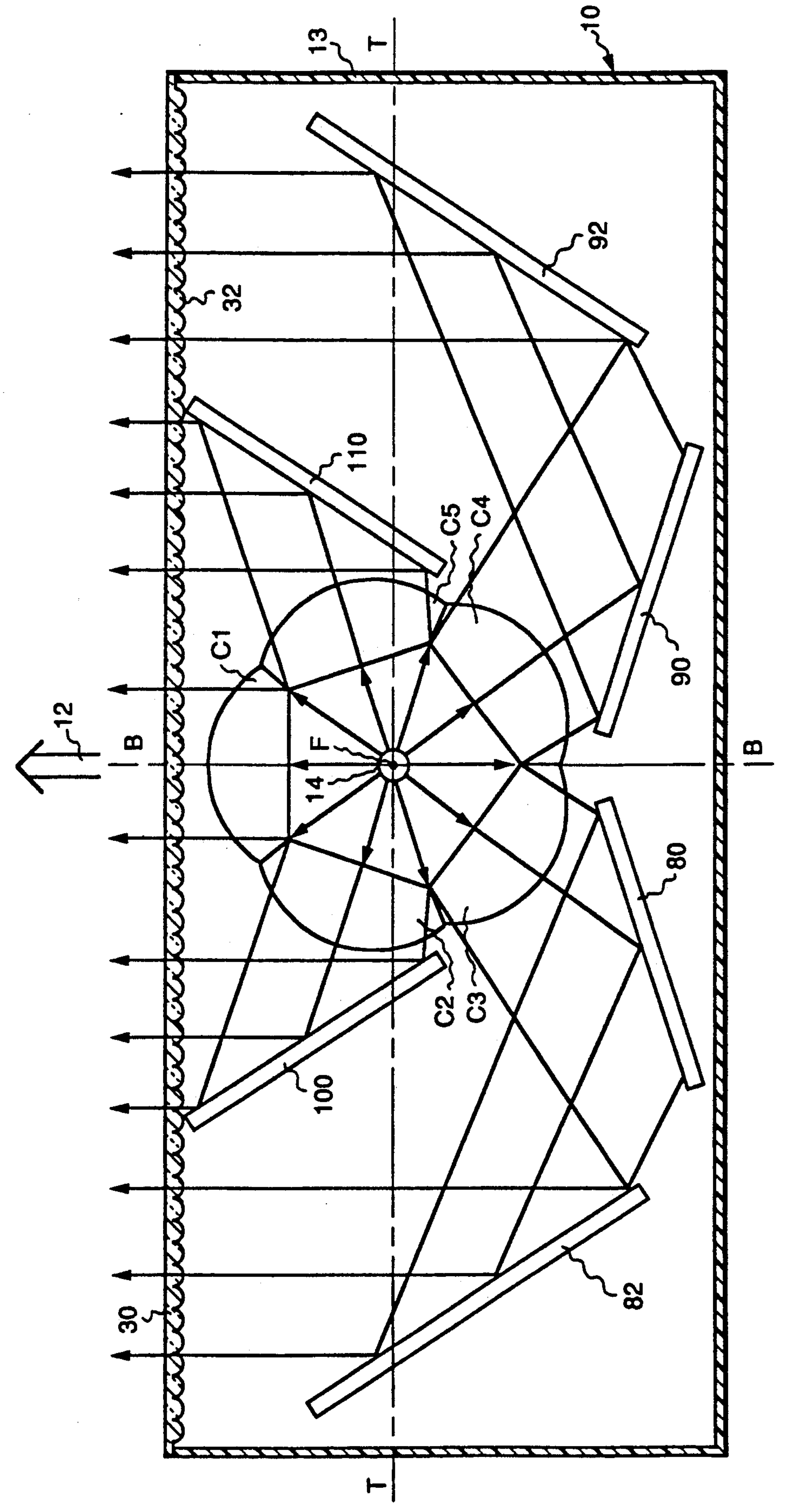
FIG. 4 is a plan view of another embodiment of the invention.

FIG. 4 shows another embodiment of a headlight with a low height-to-width ratio in accordance with the present invention. As shown, five mutually contacting collimating lenses C1-C5 surround light source 14. The focal points of the lenses coincide with the center F of light source 14 and their optical axes lie in a common plane. The optical axes of successive lenses are displaced from each other by an angle of 72°. As seen in the case of the embodiment of FIG. 1, the first lens C1 is positioned forward of light source 14. Second and third lenses C2 and C3 are positioned in mirror image relationship to fifth and fourth lenses C5 and C4 respectively, on opposite sides of axis B—B. Lenses C3 and C4, which face lens C1, abut each other along axis B—B rearward of light source 14. Lens C2 is positioned between lenses C3 and C1 in abutting relationship with both. Similarly, lens C5 is positioned between lenses C4 and C1 and abuts both of the latter lenses.

Except for lens C1, each collimating lens has a separate reflector set associated therewith. The reflector sets 100 and 110, each including at least one reflector, are associated with lenses C2 and C5 respectively. Reflectors 100 and 110 are angularly positioned relative to axis B—B so as to direct the light output from the associated lenses in the forward direction. Lenses C3 and C4 have reflector sets 80, 82 and 90, 92, respectively, associated therewith. In each of the last-mentioned reflector sets, the first and second reflectors 80 and 82, and 90 and 92, respectively, cooperate to redirect the collimated light received from the associated lens in the forward direction substantially parallel to axis B—B. In each of these reflector sets, second reflectors 82 and 92 are laterally spaced from axis B—B a distance sufficient therefrom, so that any other reflector positioned on the same side of axis B—B does not interfere with the light reflected by these second reflectors.

All reflectors in the embodiment of FIG. 4 have planar reflecting surfaces normal to the plane defined by axes B—B and T—T. It will be understood that each individual reflector in FIG. 4 may be configured in similar manner to the arrangement shown in FIGS. 1 and 2, wherein each reflector set includes an array of discrete, parallel reflectors mutually spaced from each other. Either arrangement, or combinations thereof, will be effective so long as such reflectors fully redirect the collimated light outputs from lenses C2-C5 into the forward direction.

It will be understood by those skilled in the art that, in lieu of the array of lenticules shown in FIGS. 1 and 4 as incorporated into frontal lens 30, lenticules 32 may instead be incorporated into the individual reflectors shown in FIGS. 1, 2 and 4 for imposing the desired light pattern on the forward-directed light outputs. Moreover, cylindrical prisms or the like may be used for the light-refracting means in lieu of the array of lenticules.

From the foregoing discussion, it will be clear that the present invention makes possible the use of headlights with very low height-to-width ratios which will meet the forward illumination requirements of motor vehicles. Height-to-width ratios H/W that range from about 1:8 to about 1:4 are now feasible and are readily incorporated into a vehicle body having extremely streamlined contours.

It will be understood that the specific embodiments of the invention shown and described herein are exemplary only. Numerous variations and equivalents will now occur to those skilled in the art without departing from the spirit and scope of the present invention. Accordingly, it is intended that all subject matter described herein and shown in the accompanying drawings be regarded as illustrative only and not in a limiting sense and that the scope of the invention be determined solely by the appended claims.

What is claimed is:

1. A headlight for projecting a light beam in a forward direction substantially normal to the height (H) and width (W) dimensions of the headlight housing, where the ratio H/W is low, said headlight comprising:

a light source positioned at the intersection of the axis of said beam and a lateral axis perpendicular thereto, said lateral axis being parallel to said width dimension;

a plurality of collimating lenses arrayed around said light source with their optical axes positioned in the plane defined by said perpendicularly intersecting axes, the focal point of said collimating lenses being substantially coincident with said axial intersection, each of said lenses having a height substantially equal to the interior height dimension of said housing, each lens being positioned to receive light directly from said source to provide a collimated light output in which the light rays are parallel to the optical axis of said each lens;

a first one of said collimating lenses being positioned on said beam axis forward of said light source;

a plurality of reflectors associated with the remaining ones of said collimating lenses positioned on opposite sides of said beam axis at an angle thereto so as to redirect the collimated light output from said lenses into said forward direction, said reflectors being laterally spaced from each other such that the collimated light output from said lenses is distributed substantially along the full width of said housing; and a frontal lens positioned forward of said collimating lenses and of said plurality of reflectors to close off said housing.

2. A headlight as recited in claim 1 wherein a second one of said plurality of collimating lenses is positioned on said beam axis to the rear of said light source, said first and second collimating lenses being substantially equidistant from said light source; and third and fourth ones of said plurality of collimating lenses being positioned on said lateral axis on opposite sides of said light source substantially equidistant from the latter;

said plurality of reflectors being organized into first and second separate reflector sets associated with said second collimating lens, and further separate reflector sets associated with said third and fourth collimating lenses respectively, each of said reflectors having a reflecting surface substantially normal to said plane.

3. A headlight as recited in claim 2 wherein said second collimating lens has said first and second reflector sets associated therewith positioned on opposite sides of said beam axis;

each of said first and second reflector sets including a first reflector positioned to the rear of said second lens and at least one additional reflector laterally spaced from said first reflector, said first and said additional reflectors cooperating to redirect light received from said second lens into said forward direction;

said additional reflector in each of said first and second reflector sets being laterally spaced from said beam axis a distance sufficient to avoid interference by said third and fourth collimating lenses, respectively, with the light reflected by said additional reflector.

4. A headlight as recited in claim 3 wherein said further separate reflector sets comprise third and fourth reflector sets associated, respectively, with said third and fourth collimating lenses, said third and fourth reflector sets being positioned on opposite sides of said beam axis at a distance therefrom sufficient to avoid interference with light reflected by said first and second reflector sets, respectively;

each of said third and fourth sets including at least one reflector, each of said last-recited reflectors, respectively, being angularly disposed with respect to said beam axis to redirect collimated light received from its respective associated lens into said forward direction.

5. A headlight as recited in claim 4 wherein said first and third reflector sets are arranged in mirror image relationship to said second and fourth reflector sets respectively;

each of said first reflectors being positioned at an angle of about 45° relative to said beam axis; and all remaining reflectors on the same side of said beam axis as a first reflector being positioned at an angle of about 90° with respect to said first reflector.

6. A headlight as recited in claim 1 wherein said height-to-width ratio has ranges from about 1:4 to about 1:8.

7. A headlight as recited in claim 4 wherein said light source is configured as an elongated substantially linear tube centered at said axial intersection, said tube being positioned in the plane defined by said perpendicularly intersecting axes at an angle of 45° with respect to each of said perpendicularly intersecting axes.

8. A headlight as recited in claim 5 wherein said remaining reflectors in each of said reflector sets comprise an array of discrete, parallel reflectors successively spaced from each other so as to widen said beam in a lateral direction.

9. A headlight as recited in claim 1 wherein said plurality of collimating lenses comprises five mutually contacting lenses surrounding said light source, the optical axes of said lenses being successively displaced by 72° from one another;

second and third ones of said lenses being positioned in mirror image relationship to fifth and fourth ones of said lenses, respectively, on opposite sides of said beam axis;

said plurality of reflectors being organized into separate reflector sets associated with said second, third, fourth and fifth lenses respectively, each of said reflectors having a reflecting surface substantially normal to said plane.

10. A headlight as recited in claim 9 wherein said third and fourth lenses abut each other along said beam axis at a location remote from said first lens and facing said first lens;

said second lens being positioned in abutting relationship between said first and third lenses and said fifth lens being positioned in abutting relationship between said first and fourth lenses;

each of the reflector sets associated with said second and fifth lenses respectively including at least one reflector angled to receive light from the associated one of said second and fifth lenses and to redirect the received light into said forward direction;

each of the reflector sets associated with one of said third and fourth lenses respectively including at least first and second reflectors cooperating to redirect light received from the associated lens into said forward direction without interference with light reflected by any other reflector on the same side of said beam axis.

11. A headlight as recited in claim 9 wherein said height-to-width ratio ranges from about 1:8 to about 1:4.

12. A headlight as recited in claim 10 wherein the reflectors on each side of said beam axis comprise an array of discrete, parallel reflectors mutually spaced from each other so as to widen said beam in the lateral direction.

13. A headlight as recited in claim 1 and further comprising light-refracting means for imposing a desired light pattern on said distributed collimated light outputs.

14. A headlight as recited in claim 13, wherein said light-refracting means comprises an array of lenticules incorporated into said frontal lens.

* * * * *